(12) United States Patent
Schuldt et al.

(10) Patent No.: US 10,724,204 B2
(45) Date of Patent: Jul. 28, 2020

(54) FOUNDATION FOR A WINDMILL

(71) Applicant: HOLCIM TECHNOLOGY LTD, Jona (CH)

(72) Inventors: Christian Schuldt, Holderbank (CH); Arne Stecher, Holderbank (CH)

(73) Assignee: HOLCIM TECHNOLOGY LTD, Jona (CH)

( * ) Notice: Subject to any disclaimer, the term of this patent is extended or adjusted under 35 U.S.C. 154(b) by 0 days.

(21) Appl. No.: 16/336,382

(22) PCT Filed: Sep. 20, 2017

(86) PCT No.: PCT/IB2017/001147
§ 371 (c)(1),
(2) Date: Mar. 25, 2019

(87) PCT Pub. No.: WO2018/055446
PCT Pub. Date: Mar. 29, 2018

(65) Prior Publication Data
US 2020/0018035 A1    Jan. 16, 2020

(30) Foreign Application Priority Data

Sep. 26, 2016 (AT) .................. A 439/2016

(51) Int. Cl.
*E02D 27/42* (2006.01)
*E04H 12/08* (2006.01)
*F03D 13/20* (2016.01)

(52) U.S. Cl.
CPC .......... *E02D 27/425* (2013.01); *E04H 12/08* (2013.01); *E02D 2200/1664* (2013.01); (Continued)

(58) Field of Classification Search
CPC combination set(s) only.
See application file for complete search history.

(56) References Cited

U.S. PATENT DOCUMENTS

| 4,045,929 A * | 9/1977 | Velo Dalbrenta | E04H 7/20 |
| | | | 52/223.2 |
| 2011/0061321 A1 | 3/2011 | Phuly | |

(Continued)

FOREIGN PATENT DOCUMENTS

| AT | 517958 A4 | 6/2017 |
| CN | 201428138 Y | 3/2010 |

(Continued)

OTHER PUBLICATIONS

International Search Report as issued in International Patent Application No. PCT/IB2017/001147, dated Jan. 2, 2018.

*Primary Examiner* — Kyle Armstrong
(74) *Attorney, Agent, or Firm* — Pillsbury Winthrop Shaw Pittman LLP

(57) ABSTRACT

In a foundation for a windmill with a circular or polygonal pedestal for supporting a windmill tower and a plurality of ribs, which project radially outwards from the pedestal, the pedestal is divided into a plurality of circumferential portions, wherein a circumferential portion and a rib are each formed by at least one prefabricated concrete element, respectively, and wherein the prefabricated concrete elements are made of reinforced concrete, which includes a first reinforcement structure, which includes radial tensioning elements, in particular tension rods or tensioning strands, for stressing the prefabricated concrete elements. A second reinforcement structure is also provided, which holds the circumferential portions together and is coupled with the first reinforcement structure, in particular the radial tensioning elements.

15 Claims, 4 Drawing Sheets

(52) U.S. Cl.
CPC .... *E02D 2250/00* (2013.01); *E02D 2300/002* (2013.01); *F03D 13/22* (2016.05); *F05B 2240/912* (2013.01)

(56) References Cited

U.S. PATENT DOCUMENTS

2015/0167304 A1* 6/2015 Albers .................... E02D 27/42
                                                     52/749.1
2015/0345101 A1* 12/2015 Kent ...................... E02D 27/08
                                                     52/633

FOREIGN PATENT DOCUMENTS

| | | |
|---|---|---|
| DE | 699 27 791 T2 | 7/2006 |
| EP | 2 475 872 B1 | 7/2012 |
| WO | WO 2004/101898 A2 | 11/2004 |
| WO | WO 2011/030199 A2 | 3/2011 |
| WO | WO 2012/038487 A1 | 3/2012 |

\* cited by examiner

FOUNDATION FOR A WINDMILL

CROSS-REFERENCE TO RELATED APPLICATIONS

This application is the U.S. National Stage of International Application Serial No. PCT/IB2017/001147, filed Sep. 20, 2017, which in turn claims priority to Austrian Application No. A439/2016, filed Sep. 26, 2016. The contents of all of these applications are incorporated herein by reference in their entirety.

The invention relates to a foundation for a windmill with a circular or polygonal pedestal for supporting a windmill tower and a plurality of ribs, which project radially outwards from the pedestal, wherein the pedestal is divided into a plurality of circumferential portions, wherein a circumferential portion and a rib are in each case formed by at least one prefabricated concrete element, wherein the prefabricated concrete elements are made of reinforced concrete, which comprises a first reinforcement structure, which comprises radial tensioning elements for stressing the prefabricated concrete elements.

Furthermore, the invention relates to a wind turbine with a mast and a rotor mounted on the mast, wherein the mast is mounted on a foundation.

A high manual and administrative effort is required for the production of the foundation of onshore wind power installations, and the production is very time-consuming. In view of the increasing dimensions of modern wind turbines, the foundation is subjected to very high loads and has to be dimensioned accordingly. Present-day wind turbines have a tower with a height of up to 150 m and generate up to 6 MW. In the majority of cases, the tower or mast of wind turbines is made of reinforced concrete and is constructed using prefabricated concrete elements. Alternatively, the windmill tower can be formed by a steel construction.

The foundations for wind power installations have hitherto been produced essentially by excavating an excavation pit, introducing a granular sub-structure, erecting a foundation component, executing the necessary formwork and reinforcement work and subsequent filling of the excavation pit with in-situ concrete, wherein the concrete has been transported as ready-mix concrete by ready-mix trucks to the work site and cast into the excavation pit. The central foundation component usually has a hollow-cylindrical configuration and is generally prefabricated and transported as a unit to the given assembly site.

The production of a windmill foundation using in-situ concrete is linked to a number of drawbacks. It requires complex logistics for the planning of the production activities at the construction site and it is associated with time-consuming and costly procedures at the construction site in respect of the erection of the formwork and the reinforcement structure as well as the transporting and casting of the concrete. This applies in particular in view of the fact that up to 1000 m³ of concrete may be required for large foundations.

In order to improve the construction process of a foundation, it has already been proposed in WO 2004/101898 A2 to construct the foundation using prefabricated concrete elements. Such concrete elements are produced in a prefabrication plant and transported to the work site, where they are brought into position using a crane and are then connected together. The duration of the construction processes at the work site can thus be reduced considerably. The prefabricated concrete elements, when interconnected, form a foundation with a central pedestal and a plurality of ribs, which each project radially outwards from the pedestal. Each prefabricated concrete element forms one of the ribs and an associated circumferential portion of the pedestal. The circumferential portions of the pedestal are interconnected by means of screwed flanges. As is described in WO 2004/101898 A2, the prefabricated concrete elements can be steel-reinforced. Once the foundation has been formed, the tower or mast of the windmill is built on the pedestal and is fastened to the pedestal using anchor bolts.

Furthermore, a foundation is known from EP 2475872 B1, which comprises prefabricated concrete elements and in which the concrete elements are stressed with the aid of tensioning elements.

By using prefabricated concrete elements, the elements can be produced in a controlled environment, so that the quality of the hardened concrete can be improved. From a financial point of view, the moulds used in a prefabrication plant can be reused many times before they have to be replaced, so that the costs for the mould or the formwork per unit are lower than in the case of production using in-situ concrete, which each time requires specially built and reusable formwork.

Wind turbines are subjected to loads and stresses of a specific nature, which have to be taken up by the foundation. The wind itself acts in an unpredictable and changeable way. On the other hand, dynamic load components due to vibrations and resonances act on the structure of larger installations. Furthermore, towers with a height of 100 metres and more transmit considerable eccentric loads to the foundation, because of the occurring tilting moment. The concrete of the foundation must be resistant to compression, which arises in the compressed zone, and the reinforcement structure of the concrete must take up tensile forces in the opposite part of the foundation, because the concrete itself has a relatively low tensile strength.

Foundations comprising prefabricated reinforced concrete elements have the advantage that the capability and the quality of the concrete are higher, so that there is a lower risk of a crack formation and a higher resistance with respect to dynamic and static loads. A drawback, however, is that, in contrast with foundations cast from in-situ concrete, no monolithic structure is provided, so that technical solutions for the secure interconnection of the prefabricated concrete elements have to be developed to mimic a monolithic structure.

The object of the present invention, therefore, consists in providing an improved foundation for a windmill, which comprises prefabricated reinforced concrete elements, but which acts similar to a monolithic foundation in order to withstand high static and dynamic loads.

To solve this and other objects, the invention provides a foundation for a windmill of a type defined at the outset, which foundation comprises a circular or polygonal pedestal for supporting a windmill tower and a plurality of ribs, which project radially outwards from the pedestal, wherein the pedestal is divided into a plurality of circumferential portions, wherein a circumferential portion and a rib are each formed from at least one prefabricated concrete element, wherein the prefabricated concrete elements are made from reinforced concrete, which comprises a first reinforcement structure, which comprises radial tensioning elements for stressing the prefabricated concrete elements, and is characterised in that a second reinforcement structure is provided, which holds the prefabricated concrete elements together and is coupled with the first reinforcement structure.

The second reinforcement structure can be of any type that is suitable for rigidly holding together the prefabricated concrete elements in order to form a monolithic structure. The second reinforcement structure is different from the first reinforcement structure and therefore is preferably neither embedded in the prefabricated concrete elements nor formed by tensioning elements passing through the concrete elements. According to a feature of the invention, the second reinforcement structure is coupled with the first reinforcement structure, as result of which an uninterrupted load path between the reinforcement structures is enabled, so that the forces introduced into the foundation are efficiently distributed. In the context of the invention, the coupling of the first and the second reinforcement structure means that the forces acting on the first reinforcement structure are transmitted to the second reinforcement structure without concrete being arranged in between, and vice versa. Accordingly, the first and the second reinforcement structure can be connected to one another directly or via a rigid connecting element different from concrete.

The first reinforcement structure comprises radial tensioning elements, which are preferably made of steel or a material with similar tensile strength. The tensioning elements preferably extend in the longitudinal direction of the ribs. The radial tensioning elements serve to subject the prefabricated concrete elements to a compressive force in the sense of a prestressed concrete, as a result of which an increase in the tensile strength of the concrete elements is achieved. The pre-stressing is preferably applied after the hardening of the concrete. For this purpose, the tensioning elements, such as for example tension rods, tension profiles, tensioning wires or strands, are usually inserted into a sheet-metal or plastic cladding tube and encased with anchor bodies at both ends in the concrete element without pre-tensioning. After the setting of the concrete, the tensioning elements are tensioned at the anchors. If a single concrete element forms a circumferential portion of the pedestal and a rib, at least one tensioning element extends in the radial direction of the foundation through the entire concrete element and pre-stresses the latter. In the case where at least two concrete elements adjoining one another in the radial direction jointly form a circumferential portion of the pedestal and a rib, the at least one tensioning element extends through the respective plurality of concrete elements and has the additional function of stressing said concrete elements.

The tensioning elements are preferably arranged such that they pre-stress or stress together only one circumferential portion and one associated rib, respectively. It is therefore not provided for the tensioning elements to extend over the diameter of the foundation and thus to stress two concrete elements lying opposite relative to the foundation axis.

A preferred embodiment provides for a plurality of radial tensioning elements being arranged distributed over the height of the concrete elements forming the pedestal and the ribs.

The first reinforcement structure can additionally comprise a reinforcement of steel rods or suchlike embedded in the concrete.

The second reinforcement structure preferably comprises a plurality of rigid elongated reinforcement elements, in particular steel profiles or steel rods, which in each case interconnect tensioning elements of a pair of prefabricated concrete elements arranged opposite relative to the foundation axis, in such a way that a hollow space is crossed which is encircled by the pedestal. The elongated reinforcement elements of the second reinforcement structure are coupled with the first reinforcement structure, in particular with the radial tensioning elements. The tensioning elements of prefabricated concrete elements arranged opposite to each other are thus interconnected by the elongated reinforcement elements of the second reinforcement structure, wherein a load transfer path is formed between the first reinforcement structure of the prefabricated concrete elements arranged opposite to each other. This results in the tensile load, which is exerted on the foundation due to a bending moment of the tower, being taken up not only by the first reinforcement structure which is arranged on one side of the foundation, but is also transmitted to the first reinforcement structure which is arranged on the opposite side of the foundation.

According to a preferred embodiment of the invention, each pair of prefabricated concrete elements arranged opposite to each other is connected by means of one of the rigid elongated reinforcement elements. A plurality of elongated reinforcement elements, in particular steel rods or steel profiles, thus cross the hollow space encircled by the pedestal. Because these crossing elongated reinforcement elements are all arranged diametrically, they meet in the centre of the pedestal, so that a symmetrical arrangement is achieved, which ensures optimum distribution of the forces inside the entire foundation.

The elongated reinforcement elements can cross the pedestal in a horizontal plane. On the one hand, the rigid elongated reinforcement elements are preferably each fastened in an upper region of the pedestal to a tensioning element of the one concrete element of the pair of concrete elements arranged opposite to each other and, on the other hand, are fastened in a lower region of the pedestal to a tensioning element of the other concrete element of the pair of concrete elements arranged opposite to each other, so that they extend obliquely to the horizontal axis. The tensioning elements of prefabricated concrete elements being arranged opposite to each other are thus coupled together in at least two different planes, such as for example in an upper and a lower plane.

In this connection, it is advantageous if the rigid elongated reinforcement elements are interconnected at their crossing point, which is preferably arranged on an axis of the pedestal. A centre-point is thus provided in the axis of symmetry of the foundation, which enables a load distribution in different directions.

With regard to the coupling between the first reinforcement structure and the second reinforcement structure, a preferred embodiment provides for the second reinforcement structure being coupled with the first reinforcement structure, in particular the radial tensioning elements, by means of a screw connection or a weld joint.

The hollow space inside the pedestal can be used for various purposes, for example as a storage space or for carrying out maintenance work, and it can therefore be provided with steps, platforms etc. Furthermore, the hollow space can also be used for the installation of post-tensioning cables, access to the latter and their maintenance, wherein the post-tensioning cables are arranged in order to stabilise the tower or the mast of the windmill.

According to a preferred embodiment, the prefabricated concrete elements comprise a base plate for supporting the rib and are constituted integral therewith. Accordingly, the prefabricated concrete elements can have a cross-section in the shape of an inverted "T", wherein the horizontal T-bar is formed by the base plate and the vertical T-bar is formed by the rib. The rib, however, does not necessarily have to be constituted strictly in the shape of a vertical bar. The rib can also have a cross-section which narrows towards the tip. Alternatively, the prefabricated concrete elements can also have a cross-section in the shape of an "I". Such a shape, proceeding from the inverted T-shape described above, is obtained by an upper horizontal bar, which is preferably parallel to the lower horizontal T-bar.

Furthermore, the height of the rib can preferably increase continuously towards the pedestal. A continuously increasing height of the rib makes it possible to adapt the cross-sectional area of the rib to the force propagation, and it can for example be implemented such that the upper face or the upper edge of the rib is designed as a ramp, which rises towards the pedestal. Alternatively, the rib can comprise a curved, i.e. concave, configuration of the upper face or the upper edge. In any event, the height of the rib can increase towards the pedestal in order to reach the height of the pedestal at the point where the rib changes over into the pedestal.

In order to close the hollow space inside the pedestal at its bottom, a preferred embodiment of the invention provides for the base plate comprising an edge portion which projects inwards into the hollow space encircled by the pedestal. In particular, the edge portions of all the prefabricated concrete elements together form a circumferential, in particular circular edge, which provides support at the circumference for a central bottom plate which is arranged at the bottom of the pedestal.

According to a further preferred embodiment of the invention, the prefabricated concrete elements are tightened together by means of at least one post-tensioning cable which is arranged in a circumferential, in particular circular, passage which is formed in the pedestal. Such cables have the function of an additional reinforcement structure, but in contrast to the second reinforcement structure according to the invention, the cables are not coupled with the first reinforcement structure embedded in the prefabricated concrete elements.

Instead of tensioning cables extending in the circumferential direction, tangential tensioning elements, in particular tension rods or tensioning strands, can also be provided, which stress adjacent circumferential portions of the pedestal respectively.

When the prefabricated concrete elements are tightened to one another, the lateral faces of adjacent circumferential portions of the pedestal are pressed against one another. For the precise alignment of the adjacent circumferential portions with one another, the lateral faces can comprise form-fitting elements in the nature of a tongue and groove arrangement, which cooperate with one another to ensure the relative position of the segments.

The installation of the prefabricated concrete elements at the work site is considerably simplified if, according to a preferred embodiment, adjacent prefabricated concrete elements are spaced apart from one another in the circumferential direction in their portions which project outwards from the pedestal. In particular, the base plates have a width dimension which is such that the base plates of adjacent prefabricated concrete elements do not touch one another. The production tolerances can thus be met in the production of the prefabricated concrete elements.

The concrete used for the production of the prefabricated concrete elements can be of any type that is typically also used for casting concrete at the point of use. In addition to additives and water, concrete contains Portland cement as a hydraulic binder.

Fibre-reinforced concrete can also be used to produce the prefabricated concrete elements. The fibres can be made from any fibre material that contributes towards increasing the structural integrity, in particular the strength, the impact strength and/or the durability, of the resultant concrete structure. Fibre-reinforced concrete contains short discrete reinforcement fibres, which are uniformly distributed and are randomly orientated.

The reinforcement fibres are preferably carbon fibres, synthetic fibres and in particular polypropylene fibres. Alternatively, the reinforcement fibres can be steel fibres, glass fibres or natural fibres.

The invention will be described in detail below by reference to an embodiment serving as an example and represented in the drawing.

Figure 1:
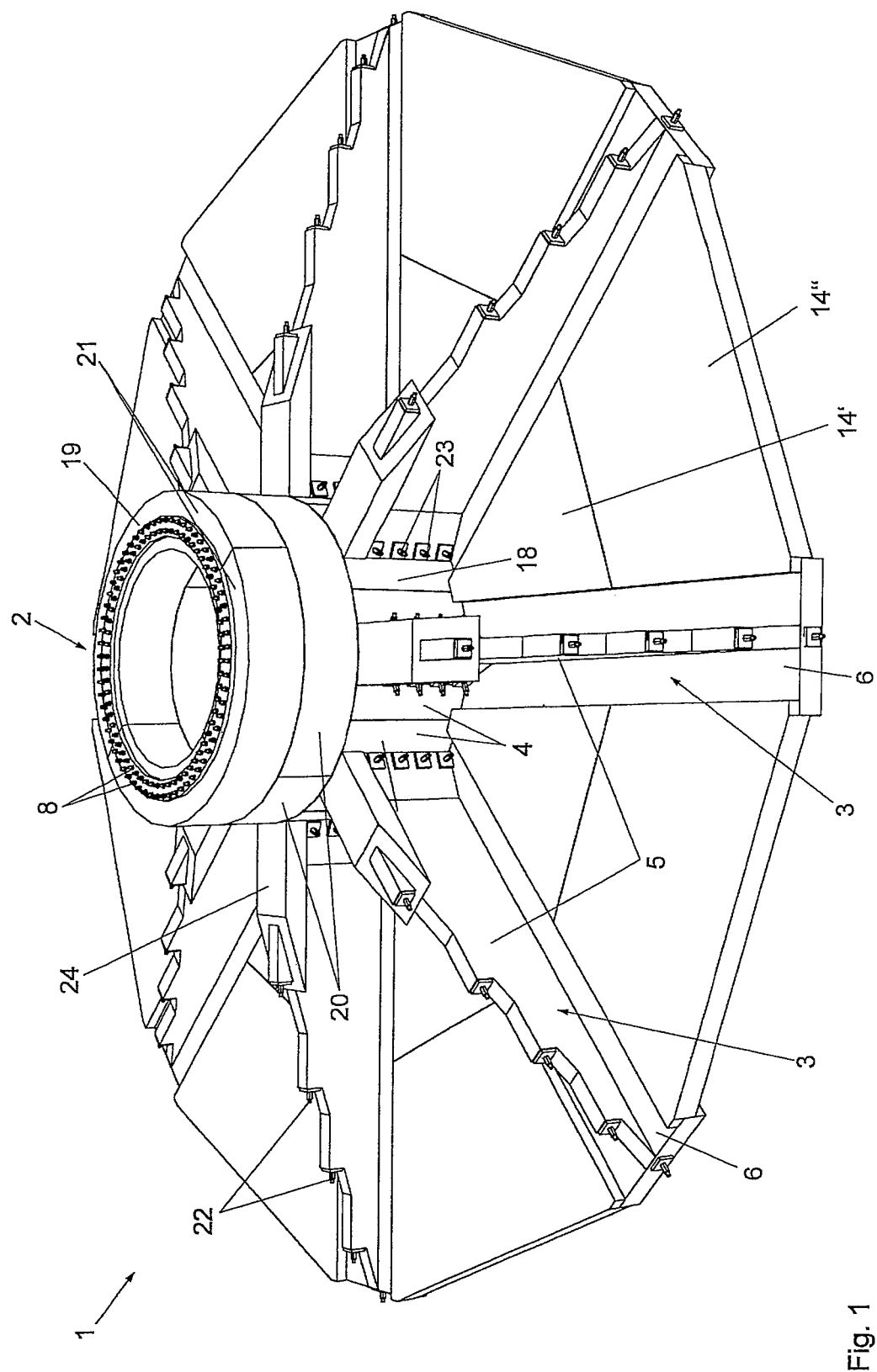
FIG. 1 shows a windmill foundation in a perspective view.
Figure 2:
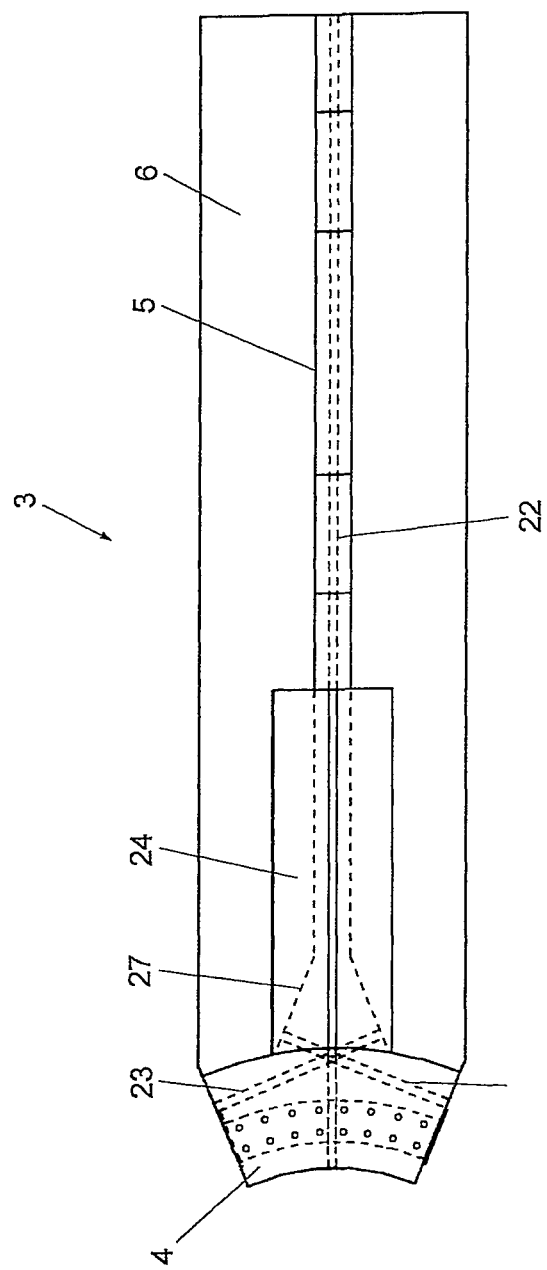
FIG. 2 shows a prefabricated concrete element which is used in the foundation according to FIG. 1.

A foundation 1 is represented in FIG. 1, which comprises a plurality of prefabricated concrete elements 3. Foundation 1 comprises a circular pedestal 2 in the form of a hollow cylinder for supporting a windmill tower. Foundation 1 further comprises a plurality of ribs 5, which project radially outwards from pedestal 2. Pedestal 2 is divided into a plurality of circumferential portions 4 (FIG. 2), wherein a circumferential portion 4 and a rib 5 are in each case constituted integral with one another as a prefabricated concrete element 3, as represented in FIG. 2. Prefabricated concrete element 3 comprises a base plate 6, which is also constituted integral with rib 5. Prefabricated concrete elements 3 are made from reinforced concrete with reinforcement rods, which are embedded in prefabricated concrete elements 3.

Although the ribs are represented in FIG. 2 as a prefabricated concrete element which comprises a single piece, the ribs can also be composed of two or more rib portions. This is especially advantageous when a rib is to be provided, the radial length whereof exceeds the permissible length of ordinary transport equipment. In particular, two or more rib portions can be produced as separate prefabricated concrete elements, which are transported separately to the work site and assembled rigidly with one another at the work site.

Figure 3:
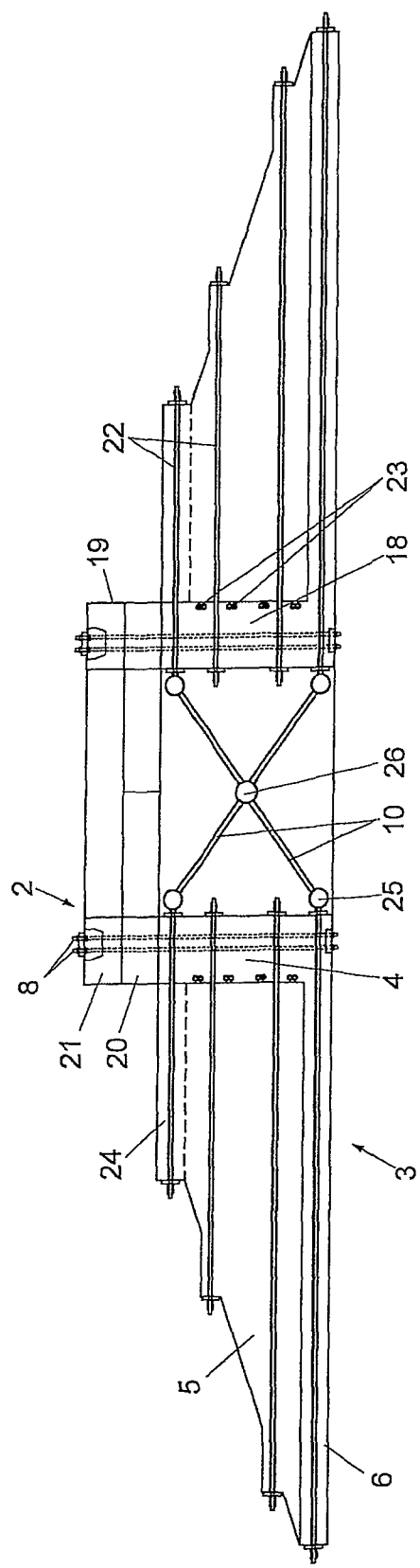
FIG. 3 shows a cross-section through the foundation according to FIG. 1

It can be seen in FIGS. 1, 2 and 3 that prefabricated concrete elements 3 are constituted I-shaped in cross-section, wherein bottom plate 6 and a cover plate 24 are connected together in one piece by means of the web of rib 5.

For the precise alignment of adjacent circumferential portions 4 with one another, the lateral faces can comprise form-fitting elements (not represented) in the manner of a trapezoidal tongue and groove arrangement, which cooperate with one another to ensure the relative position of elements 3.

As can be seen in FIG. 1, pedestal 2 is divided in the height direction into an annular base portion 18 and an annular adapter portion 19. The annular base portion 18 is formed by circumferential portions 4. The annular adapter portion 19 is arranged on the annular base portion 18 and comprises two rings of prefabricated concrete elements arranged one above the other, wherein the lower ring is formed by two segments 20 and the upper ring is formed by two segments 21. Segments 20 and 21 each extend over an angle of 180° and are formed from prefabricated concrete elements. The splitting of the rings is arranged offset by 90°.

The annular adapter portion provides at its upper side a horizontal surface, on which the windmill tower (not represented) is erected. Anchor bolts 8 are provided for fastening the windmill tower.

The intermediate space between the prefabricated concrete elements 3 is bridged in each case by bridging plates 14, which are divided into two. An inner bridging plate is denoted with 14' and an outer bridging plate is denoted with 14". Bridging plates 14' and 14" lie with a recessed edge on the assigned edges of base plate 6 of the concrete elements 3. The bridging plates can be fastened with bolts to the base plate 6 of the prefabricated concrete elements 3.

The reinforcement structure of foundation 1 can be seen in the cross-sectional representation according to FIG. 3. The first reinforcement structure comprises, apart from the steel reinforcement rods (not represented) embedded in prefabricated concrete elements 3, tensioning elements 22. The tensioning elements 22 each cross a passage formed in the concrete elements 3 and are constituted as tension rods or tensioning wires or strands made of steel, whose ends projecting out of the concrete element comprise stop elements, which are tensioned against concrete element 3, so that the tensioning elements are loaded under tension. A second reinforcement structure is coupled to tensioning elements 22, which is formed from steel rods or steel profiles 10 and interconnects elements 22 from concrete elements 3 arranged opposite to each other in an X-shaped manner tensioning in such a way that they cross a hollow space 12, which is encircled by pedestal 2. The coupling of steel profiles 10 to tensioning elements 22 takes place by means of diagrammatically represented coupling elements 25, to which tensioning elements 22 and steel profiles 10 are screwed or welded. In this connection the x-shaped configuration of the steel profiles 10 is achieved by the fact that the steel profiles 10 are fastened to a central element 26, from which steel profiles 10 extend in a star-shaped manner.

Figure 4:
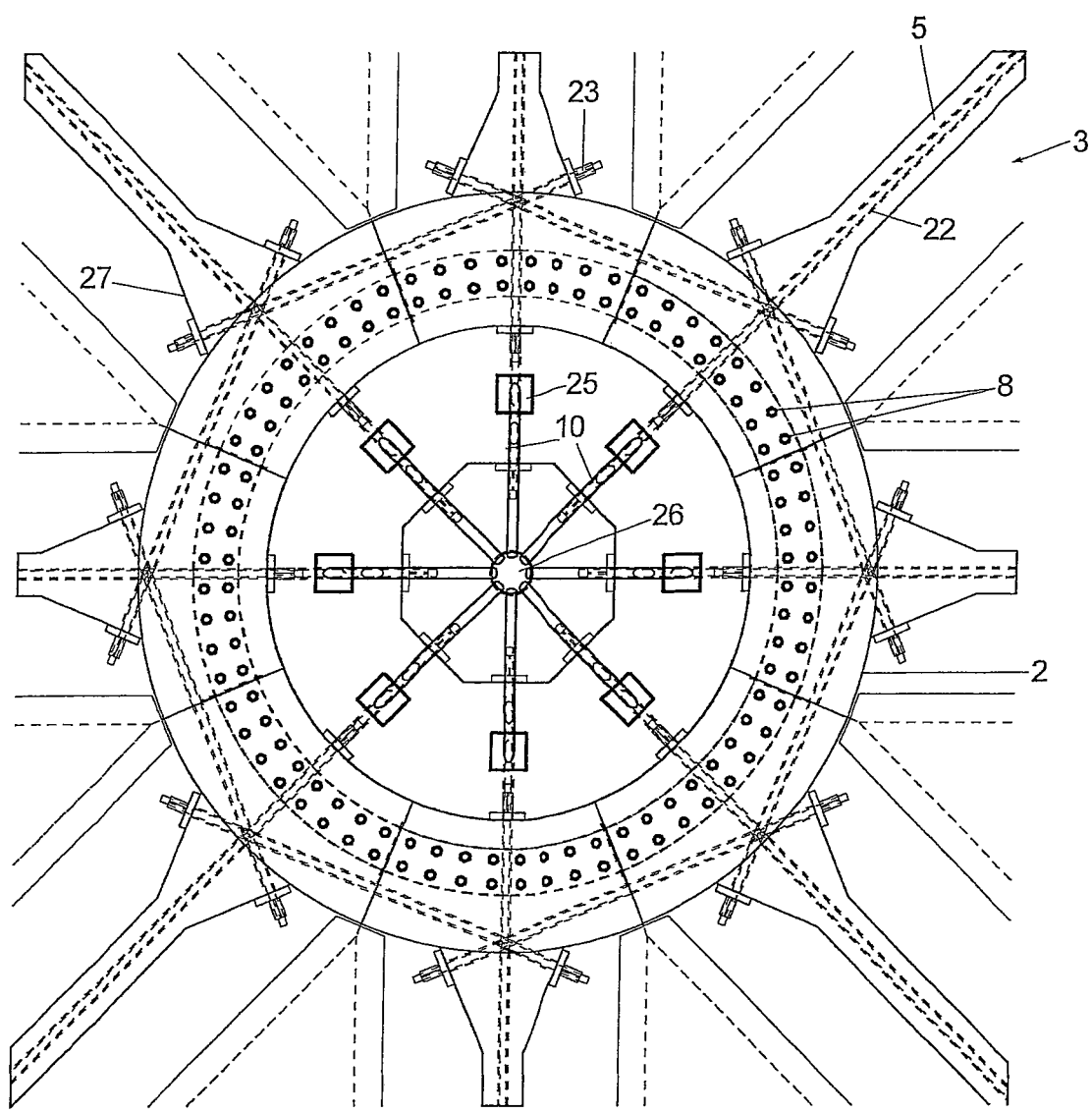
FIG. 4 shows a partial view of the foundation according to FIG. 1 in a plan view.

In the representation according to FIG. 4, it can be seen that adjacent prefabricated concrete elements 3 are stressed against one another in the region of circumferential portions 4 of pedestal 2 with the aid of tangentially running tensioning elements 23. Tensioning elements 23 cross passages, which are formed in the prefabricated concrete elements 3 and are preferably made of steel. Tensioning elements 23 can be constituted by tension rods or tensioning strands. In order to provide suitable stop surfaces, the prefabricated concrete elements each comprise, in the transition from the circumferential portions 4 to ribs 5, obliquely running transition portions 27, whose stop surfaces run normal to the tangential tensioning elements 23. Engaging with each prefabricated concrete element 3 is a first tensioning element 23, which stresses the respective concrete element 3 with the adjacent right-hand concrete element 3, and a second tensioning element 23, which braces the respective concrete element 3 with the adjacent left-hand concrete element 3.

The invention claimed is:

1. A foundation for a windmill comprising a circular or polygonal pedestal for supporting a windmill tower and a plurality of ribs, which project radially outwards from the pedestal, wherein the pedestal is divided into a plurality of circumferential portions, wherein a circumferential portion of the plurality of circumferential portions and a rib of the plurality of ribs are each formed, respectively, by at least one prefabricated concrete element, wherein the prefabricated concrete elements are made of reinforced concrete including a first reinforcement structure for stressing the prefabricated concrete elements, wherein the first reinforcement structure comprises radial tensioning elements, wherein a second reinforcement structure is provided, which holds the circumferential portions together and is coupled with the first reinforcement structure, wherein the second reinforcement structure comprises a plurality of rigid elongated reinforcement elements, which interconnect the radial tensioning elements of a pair of the prefabricated concrete elements arranged opposite relative to the foundation axis, such that a hollow space, which is formed by an inner periphery of the pedestal, is crossed, wherein the rigid elongated reinforcement elements are coupled to the radial tensioning elements by means of coupling elements, to which the radial tensioning elements and the rigid elongated reinforcement elements are fastened and wherein the rigid elongated reinforcement elements are fastened to a central element, from which the rigid elongated reinforcement elements extend in a star-shaped manner.

2. The foundation according to claim 1, wherein each pair of prefabricated concrete elements arranged opposite to each other is connected by means of one of the rigid elongated reinforcement elements.

3. The foundation according to claim 1, wherein the rigid elongated reinforcement elements are each fastened in an upper region of the pedestal to one of the radial tensioning elements of one concrete element of a pair of concrete elements arranged opposite to each other and are fastened in a lower region of the pedestal to another one of the radial tensioning elements of another concrete element of the pair of concrete elements arranged opposite to each other.

4. The foundation according to claim 1, wherein the central element is arranged on an axis of the pedestal.

5. The foundation according to claim 1, wherein the second reinforcement structure is coupled with the first reinforcement structure by means of a screw connection or weld joint.

6. The foundation according to claim 5, wherein the second reinforcement structure is coupled with the radial tensioning elements by means of the screw connection or weld joint.

7. The foundation according to claim 1, wherein a height of the rib increases continuously towards the pedestal.

8. The foundation according to claim 1, wherein a plurality of radial tensioning elements is arranged distributed over a height of the concrete elements forming the pedestal and the ribs.

9. The foundation according to claim 1, wherein tangential tensioning elements are provided, which stress adjacent circumferential portions of the pedestal, respectively.

10. The foundation according to claim 9, wherein the tangential tensioning elements are tension rods or tensioning strands.

11. A wind turbine with a mast and a rotor mounted on the mast, wherein the mast is mounted on a foundation according to claim 1.

12. The wind turbine according to claim 11, wherein the wind turbine is an on-shore wind turbine.

13. The foundation according to claim 1, wherein the radial tensioning elements are tension rods or tensioning strands.

14. The foundation according to claim 1, wherein the plurality of rigid elongated reinforcement elements are steel profiles or steel rods.

15. The foundation according to claim 1, wherein the second reinforcement structure is coupled with the radial tensioning elements.

* * * * *